March 11, 1941.  L. R. MARTIN  2,234,702
MOTION PICTURE TITLER
Filed Aug. 11, 1939
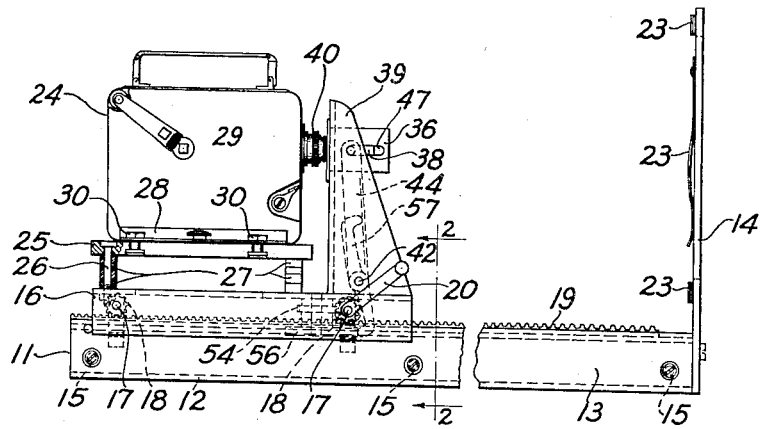
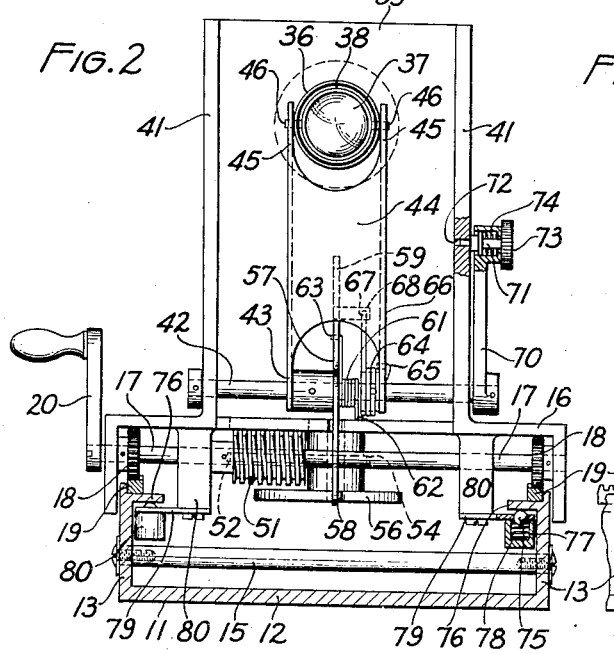
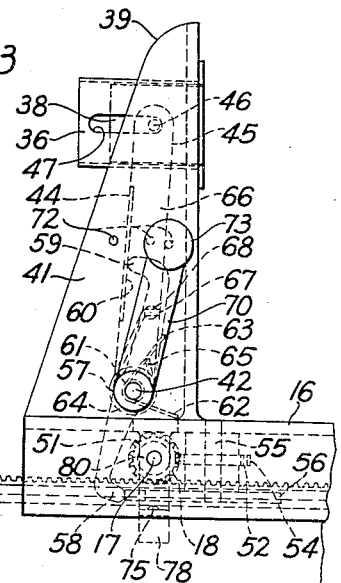
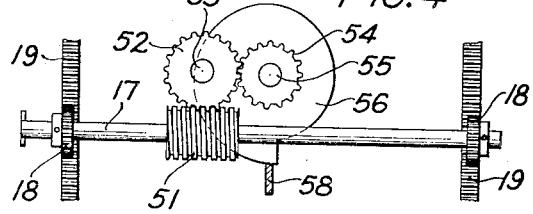
LAWRENCE R. MARTIN
INVENTOR
BY
ATTORNEYS Patented Mar. 11, 1941

2,234,702

UNITED STATES PATENT OFFICE 2,234,702

MOTION PICTURE TITLER

Lawrence R. Martin, Rochester, N. Y., assignor to Eastman Kodak Company, Rochester, N. Y., a corporation of New Jersey Application August 11, 1939, Serial No. 289,681

12 Claims. (Cl. 88—24)

The present invention relates to photography, and more particularly to a titler for motion picture cameras.

One object of the invention is the provision of a titler which is formed with an adjustable camera supporting bed member which may be selectively moved towards or away from a title holding easel to vary the size of the title recorded by the camera.

Another object of the invention is the provision of a supplementary lens system for the camera which is actuated and adjusted by and in proportion to the movement of the bed member to maintain the camera in proper focus on the title easel.

Still another object of the invention is the provision of a control means for the supplementary lens system which is simple in construction, positive in its action, and which automatically maintains the camera in focus on the title easel for all positions of the camera carriage.

And yet another object of the invention is the provision of an auxiliary member for adjusting the supplementary lens system to fix the focus thereof, the camera then being movable into and out of focus to insure desirable photographic effect.

To these and other ends, the invention resides in certain improvements and combinations of parts all as will be hereinafter more fully described, the novel features being pointed out in the claims at the end of the specification.

In the drawing:

Fig. 1 is a side elevation view of a motion picture titler constructed in accordance with the present invention, showing the relation thereto of an adjustable supplementary lens system for the camera;

Fig. 2 is a vertical sectional view taken substantially on line 2—2 of Fig. 1, showing the arrangement of the mechanism by which the supplementary lens system is adjusted to maintain the camera in focus on the title holding easel;

Fig. 3 is a side view of the mechanism illustrated in Fig. 2;

Fig. 4 is a plan view of the mechanism by which the supplementary lens system is controlled from the movable camera supporting bed member; and Fig. 5 is a vertical sectional view through the lens holding tube of the supplementary lens system, showing the arrangement of the different lens elements.

Similar reference numerals throughout the various views indicate the same parts.

The drawing shows a motion picture titler which comprises a bed 11 which is U-shaped in transverse sections to provide a bottom 12 and a pair of parallel spaced side rails 13 on one end of which a title easel 14 is fixedly mounted. Suitable tie-rods or braces 15 extend between the side rails, as shown in Fig. 2. A camera carriage 16 has mounted thereon a transversely arranged shaft 17 on the ends of which are fixed a pair of pinions 18 which are arranged to engage and ride along racks 19 suitably secured to the top of the side rails 13, as best shown in Fig. 2. The shaft 17 is provided with a handle or crank 20 by which the shaft 17 may be rotated. It is apparent from an inspection of Figs. 1 and 2 that the turning of the handle 20 will serve to roll the pinions 18 along the racks 19 to move the carriage 16 toward or away from the easel 14.

The title to be recorded is placed on the easel 14 and it is retained in position thereon by a plurality of resilient clips or fingers 23. A motion picture camera 24, of any desired make, is then mounted on a platform 25, which is secured to the carriage 16 by means of posts or bolts 26. In order to accommodate cameras of various types the posts 26 are provided with tubular spacers or sleeves 27 which are interposed between the carriage and the platform 25 to properly elevate the latter to accommodate the camera being positioned thereon. When the platform 25 has been properly elevated, the camera 24 may be secured thereto in any suitable manner, as by means of L-shaped clamps 28 which tightly engage the opposite side walls 29 of the camera and are secured to the platform 25 by means of bolts 30, all as shown in Fig. 1. The platform 25 thus affords a support for the camera 14, and is movable as a unit with the camera carriage 16, and may, therefore, be broadly considered as a part of the latter.

Now by turning the handle 20, the pinions 18 are caused to ride or move along the racks 19 to carry the carriage 16 with its platform 25 and camera 24 toward or away from the title easel 14, as will be readily apparent from an inspection of the drawing. During such movement, the camera will move through a range of positions such as to include fields of various widths, as will be apparent to those in the art. Such movement might require a series of supplementary lenses for the camera to retain the latter in focus at the various positions, the number of such lenses being equal to the number of positions required. Experiments have shown, however, that it is possible to produce a collimating lens system of variable focal length by varying the separation of a negative and positive lens.

To this end, the present invention provides a supplementary collimating lens system which comprises a fixed positive lens 35 mounted in the lens tube 36, and a negative lens 37 secured in a sleeve 38 slidable in the tube 36 for adjusting toward and away from the fixed positive lens, in a manner to be later described. The lens tube 36 is suitably secured in position on a lens holder 39 which extends upwardly from the front of the camera carriage 16, as shown in Figs. 1 and 3.

The tube 36 is arranged in optical alignment with the objective lens 40 of the camera 24, and may be broadly considered as a part of the lens system therefor. The lens holder 39 is formed with spaced side members 41 which form spaced supports or bearings for a rock shaft 42 on which is secured the lower bifurcated end 43 of a lens moving member 44. The upper end of the latter is also bifurcated to provide a pair of spaced arms 45 which are secured to pins 46 extending radially from the sleeve 38 through slots 47 in the lens tube 36. By means of this arrangement, any movement of the rock shaft 42 will serve to adjust the lens moving member 44 and thus slide the negative lens sleeve 38 in the tube 36 to move the negative lens 37 towards or away from the positive lens 35.

In order to maintain this supplementary lens system in focus at all times and for all positions of the carriage 16, it is essential that the movement of the negative lens 37 be in the proper direction and in proper proportion to the movement of the camera carriage 16. To this end, the movement of the latter is utilized to control both the direction and the movement of the negative lens so as to secure proper and accurate focus of the camera on the title easel 14 for all positions of the carriage 16. To secure this result, the pinion shaft 17 has secured thereto a worm 51 which drives a gear 52 loosely mounted on a stub-shaft 53 secured to and depending from the carriage 16. The gear 52, in turn, meshes with a gear 54 secured to a cam shaft 55 extending downward from the carriage 16 and carrying a cam 56 of the shape best shown in Fig. 4.

A lever 57, of the shape best shown in Fig. 3, is loosely mounted intermediate this end of the rock shaft 42 and has one end 58 engaging the cam 56 while the other end 59 engages the back 60 of the lens moving member 44 as shown in Fig. 3. A coil spring 61 is wrapped around the rock shaft 42 and has one end 62 arranged to engage the carriage 16, see Fig. 3, while the other end 63 is hooked over the lever 57, as shown in Fig. 3. This spring 61 thus serves to hold the end 58 of the lever 57 in positive engagement with the cam 56 so as to be moved by the latter. A second coil spring 64 is also wrapped around the shaft 42, and has one end 65 secured to one of the side members 66 of the lens moving member 44, while the other end 67 engages a laterally extending lug 68 formed on the pivoted lever 57 to operatively connect the latter to the lens moving member. The spring 64 thus serves to retain the lens moving member 44 in engagement with the upper end 59 of the lever 57, as best shown in Fig. 3. The member 44 could be extended to engage the cam 56 so as to be directly operated thereby, but is preferred to use the intermediate lever 57 to provide a two-member connection between the cam 56 and the movable lens 37, the purpose of which arrangement will be later pointed out.

By means of the above arrangement, any movement of the carriage 16 will rotate the pinion shaft 17 and hence the cam 56. Such rotation of the cam is transmitted to the lever 57 and the lens moving member 44 to slide the negative lens 37 toward or away from the positive lens 35. The various parts are so designed that the movement of the negative lens is always in the proper direction and of proper proportion to the carriage movement, so that the lens system for the camera is always in focus on the easel 14 for any position of the camera carriage. Thus, all the operator has to do is to position the carriage 16 so as to cover the desired portion of the easel 14, and such positioning will automatically focus the supplementary lens system to maintain the camera in focus so that movement of the supplementary lens system is always in synchronism with the movement of the camera carriage.

In addition to always maintaining the lens system in focus, the above described apparatus has other desirable features. For example, in order to secure certain desirable photographic effects, the focus of the lens system may be fixed in which case the camera will be in focus for only one position of the carriage, as will be apparent to those in the art. Thus by moving the carriage to this position, the title may be gradually brought into focus, and then by moving the carriage away, the title may gradually fade out of focus. In addition, the lens 37 may be moved independently of the carriage to throw the lens system out of focus. A new title may then be placed on the easel, the lens 37 may then be moved to the proper position to bring the new title into focus. To secure these desirable results, a projecting portion of the rock shaft 42 has secured thereon the lower end of a locking arm 70, the upper end of which is provided with a spring actuated pin 71 arranged to selectively engage a series of holes 72 formed in one of the sides 41 of the lens holder 39, as best shown in Fig. 3.

It is apparent from an inspection of Figs. 2 and 3, that if the arm 70 is moved, the rock shaft 42 and hence the lens moving member 44 will be moved to adjust the negative lens 37 independently of the movement of the camera carriage 16. Now if the pin 71 is inserted in one of the holes 72 it is evident that the position of the adjustable negative lens 37 is now fixed so that the focus of the entire system is also fixed. In this arrangement, the camera will be in focus in only one position of the carriage 16 on the bed 11. If the pin 71 is moved to another hole, the focus is changed but is again fixed for only one position of the camera carriage. By thus fixing the focus, the carriage may be moved out of focus, and a new title placed on the easel 14 and the carriage again moved back into proper focus. When the lens system is thus retained in fixed focus, as above described, the point to which the carriage must be moved to bring the system into sharp focus may be determined by means of suitable co-operating scale members on the bed 11 and carriage 16.

The fixed focus may be readily and easily changed by moving the pin 71 from one hole 72 to another. This change may be accomplished by withdrawing the pin 71 by means of a finger-gripping portion 73. After the pin has been withdrawn, the arm 70 is moved to bring the pin into registry with another hold 72 at which time the portion 73 is released and a coil spring 74 serves to move the pin 71 into the registered hole 72 to lock the mechanism in the new position, all of which will be apparent from an inspection of Figs. 2 and 3. Thus the focus may be changed by positioning the arm 70, but when so positioned, the focus of the lens system is fixed and is no longer adjustable by movement of the carriage 16, as above described.

Another desirable effect which may be secured with the above device is to move the arm 70 to purposely throw the system out of focus, holding the pin 71 so that it does not engage in any of the holes 72. Then the title may be changed. Now by releasing the arm 70, the spring 64 will quickly move the lens moving member 44 into engagement with the lever 57 to bring the system back into focus. By means of this operation the title may be made to "zoom" out of focus, and the new title will then "zoom" into focus. These various effects are possible because of the two-part lever connection, the members 44 and 57, between the cam 56 and the adjustable negative lens 37. If a single connection were used between the cam 56 and the lens 37 many of the above desired results could not be obtained, as will be apparent.

Those in the art will readily appreciate that each position of the negative lens 37 must correspond to a definite position of the carriage 16 on the bed 11, in order to maintain the lens system in proper focus on the title easel 14. In order to insure the proper synchronism between the adjustable lens and the movement of the carriage, it is imperative that the pinions 18 be always maintained in positive engagement with the racks 19 so as to prevent any disengaging therefrom, the results of which will be apparent. Such positive engagement is insured, in the present embodiment, by means of a plurality of small spring pressed balls 75 which engage the under sides of inwardly extending flanges 76 formed on the side rails 13, as clearly shown in Fig. 2. These spring pressed balls thus yieldably hold the pinions in positive engagement with the racks to insure the desired synchronism between the lens system and the carriage, and yet permit free rolling or moving of the pinions along the racks. Four of these spring pressed balls are provided, one adjacent each corner of the movable carriage 16. Each of these balls is spring pressed upwardly into engagement with the flange 76 by means of a coil spring 77 positioned in a well or recess 78 formed in the end of an arm 79 which in turn is secured to the lower end of a lug 80 depending from a carriage 16, as shown in Fig. 2.

It is thus apparent from the above description that the invention provides a titler which may be readily and easily adjusted to control the size of the title recorded. It is also apparent that the supplementary lens system may be positioned to provide a fixed focus, or may be adjusted and controlled by and in synchronism with the movement of the camera carriage so as to automatically maintain the camera in focus for all positions of the camera carriage. In addition, the lens system may be purposely thrown out and into focus to secure various novel photographic results.

While one embodiment of the invention has been disclosed, it is to be understood that the inventive idea may be carried out in a number of ways. This application is therefore not to be limited to the precise details disclosed, but is intended to cover all variations and modifications thereof falling within the spirit of the invention or the scope of the appended claims.

I claim:

1. A photographic copying apparatus comprising, in combination, a bed member, a copying easel fixed at one end of said bed member, a carriage movably mounted on said bed member and arranged to support a copying camera, a supplementary lens system carried by said carriage and arranged in optical alignment with an objective lens of said camera, means for moving said carriage along said bed to position said camera relative to said easel, and means controlled by the movement of said carriage for adjusting said supplementary lens system to maintain said camera in focus with a title on said easel.

2. A photographic copying apparatus comprising, in combination, a bed member, a copying easel fixed at one end of said bed member, a carriage movably mounted on said bed member and arranged to support a copying camera, a lens system for said camera comprising a portion fixed on said carriage and a portion movably relative thereto, means for moving said carriage along said bed to position said camera relative to said easel, and means controlled by said moving means for adjusting said movable lens portion to automatically maintain said camera in focus on said easel.

3. A photographic copying apparatus comprising, in combination, a bed member, a copying easel fixed at one end of said bed member, a carriage movably mounted on said bed member and arranged to support a copying camera, a supplementary lens system carried by said carriage and arranged in optical alignment with an objective lens of said camera, said supplementary lens system comprising a fixed lens element and a movable lens element, means for moving said carriage along said bed to position said camera relative to said easel, and means controlled by said moving means for automatically adjusting said movable lens element to maintain said camera in focus on said easel for all positions of said carriage.

4. A photographic copying apparatus comprising, in combination, a bed member, a copying easel fixed at one end of said bed member, a carriage movably mounted on said bed member and arranged to support a copying camera, a lens system for said camera comprising a portion fixed on said carriage and a portion movable relative thereto, means for moving said carriage along said bed to position said camera relative to said easel, means controlled by said moving means for adjusting said movable lens portion to automatically maintain said camera in focus on said easel, and auxiliary means for moving said movable lens portion to change the focus of said lens system.

5. A photographic copying apparatus comprising, in combination, a bed member, a copying easel fixed at one end of said bed member, a carriage movably mounted on said bed member and arranged to support a copying camera, a lens system for said camera comprising a portion fixed on said carriage and a portion movably relative thereto, means for moving said carriage along said bed to position said camera relative to said easel, means controlled by said moving means for adjusting said movable lens portion to automatically maintain said camera in focus on said easel, and means for disconnecting said movable lens portion from said adjusting means and for positioning said movable lens portion to afford a fixed focus for said camera.

6. A photographic copying apparatus comprising, in combination, a bed member, a copying easel fixed at one end of said bed member, a carriage movably mounted on said bed member and arranged to support a copying camera, a supplementary lens system carried by said carriage and arranged in optical alignment with an objective lens of said camera, said supplementary lens system comprising a fixed lens element and a movable lens element, means for moving said carriage along said bed to position said camera relative to said easel, and means controlled by said moving means for automatically adjusting said movable lens portion to provide a variable focus lens system which is adapted to maintain said camera in focus on said easel for all positions along said bed member, a manual control lever operatively connected to said movable lens portion for positioning the latter independently of said adjustment means to provide a fixed focus lens system for said camera, and means for retaining said control lever in adjusted position.

7. A photographic copying apparatus comprising, in combination, a bed member, a copying easel fixed at one end of said bed member, a carriage movably mounted on said bed member and arranged to support a copying camera, a lens holder on said carriage, a supplementary lens system carried by said holder and in optical alignment with an objective lens of said camera, a lens moving member movably mounted on said holder and operatively connected to said lens system, means for moving said carriage along said bed to position said camera relative to said easel, and means operatively connected to said lens moving member and controlled by said carriage moving means for adjusting said lens system to maintain said camera in focus on said easel for all positions of said carriage.

8. A photographic copying apparatus comprising, in combination, a bed member, a copying easel fixed at one end of said bed member, a carriage movably mounted on said bed member and arranged to support a copying camera, a lens holder on said carriage, a supplementary lens system carried by said holder and in optical alignment with an objective lens of said camera, a lens moving member movably mounted on said holder and operatively connected to said lens system, means for moving said carriage along said bed to position said camera relative to said easel, means operatively connected to said lens moving member and controlled by said carriage moving means for adjusting said lens system to maintain said camera in focus on said easel for all positions of said carriage, and an arm mounted on said lens holder and connected to said lens moving member independently of said last mentioned means, said lever being adjustable to fix the focus of said supplementary lens system so that said camera will be in focus on said easel for only one position of said carriage.

9. A photographic copying apparatus comprising, in combination, a bed member, a copying easel fixed at one end of said bed member, a carriage movably mounted on said bed member and arranged to support a copying camera, a lens holder on said carriage, a supplementary lens system carried by said holder and in optical alignment with an objective lens of said camera, a lens moving member movably mounted on said holder and operatively connected to said lens system, means for moving said carriage along said bed to position said camera relative to said easel, a cam mounted on and movable with said carriage, means operatively connecting said cam with said carriage moving means to control said cam therefrom, and a lever connecting said cam and said lens moving member to move the latter in proper relation to the movement of said carriage to maintain said supplementary lens system in focus on said easel for all positions of said carriage.

10. A photographic copying apparatus comprising, in combination, a bed member, a copying easel fixed at one end of said bed member, a carriage movably mounted on said bed member and arranged to support a copying camera, a lens holder on said carriage, a supplementary lens system carried by said holder and in optical alignment with an objective lens of said camera, a lens moving member movably mounted on said holder and operatively connected to said lens system, means for moving said carriage along said bed to position said camera relative to said easel, a lever pivotally mounted on said holder and having one end adapted to engage said lens moving member, a cam mounted on said carriage and engaging the other end of said lever, means for connecting said cam to said bed moving means to control said lens system therefrom, and auxiliary means for controlling said lens moving member.

11. A photographic copying apparatus comprising, in combination, a bed member, a copying easel fixed at one end of said bed member, a carriage movably mounted on said bed member and arranged to support a copying camera, a lens holder on said carriage, a supplementary lens system carried by said holder and in optical alignment with an objective lens of said camera, said lens system comprising a fixed lens element and a movable lens element, a lens moving member pivoted on said holder and connected to said movable lens element, means for moving said carriage along said bed to position said camera relative to said easel, a cam mounted on said bed and operatively connected to and controlled by said bed moving means, and means for connecting said cam to said holder so that the movable lens element will be moved in proper relation to the movement of said bed to maintain said supplementary lens system in focus on said easel for all positions of said bed.

12. A photographic copying apparatus comprising, in combination, a bed member, a copying easel fixed at one end of said bed member, a carriage movably mounted on said bed member and arranged to support a copying camera, a lens holder on said carriage, a supplementary lens system carried by said holder and in optical alignment with an objective lens of said camera, said lens system comprising a fixed lens element and a movable lens element, a lens moving member pivoted on said holder and connected to said movable lens element, means for moving said carriage along said bed to position said camera relative to said easel, a cam mounted on said bed and operatively connected to and controlled by said bed moving means, a lever pivotally mounted on said holder and having one end in engagement with said cam to be moved thereby and another end in engagement with said lens moving member whereby any movement of said bed will correspondingly move said movable lens element the proper distance and direction to maintain said supplementary lens system in focus on said easel, an arm operatively connected to said lens moving member to position the latter independently of said cam, and means for locking said arm in adjusted position to fix said movable lens element to provide a fixed focus supplementary lens system which is in focus on said easel at only one position of said carriage.

LAWRENCE R. MARTIN.